(12) United States Patent
Kargl

(10) Patent No.: US 8,905,312 B2
(45) Date of Patent: Dec. 9, 2014

(54) IDENTIFICATION OF CONTACTLESS CARDS

(75) Inventor: Walter Kargl, Graz (AT)

(73) Assignee: Infineon Technologies AG, Neubiberg (DE)

( * ) Notice: Subject to any disclaimer, the term of this patent is extended or adjusted under 35 U.S.C. 154(b) by 959 days.

(21) Appl. No.: 11/943,648

(22) Filed: Nov. 21, 2007

(65) Prior Publication Data

US 2009/0127337 A1 May 21, 2009

(51) Int. Cl.
*G06K 7/06* (2006.01)
*G06K 7/00* (2006.01)

(52) U.S. Cl.
CPC .................................. *G06K 7/0008* (2013.01)
USPC ........ 235/441; 235/487; 235/492; 340/572.1; 340/10.1

(58) Field of Classification Search
USPC ................ 235/441, 492, 487; 340/572.1, 5.8, 340/10.1, 572.4
See application file for complete search history.

(56) References Cited

U.S. PATENT DOCUMENTS

| | | | | | |
|---|---|---|---|---|---|
| 5,191,610 | A | * | 3/1993 | Hill et al. | 380/262 |
| 5,369,706 | A | * | 11/1994 | Latka | 380/262 |
| 5,450,492 | A | * | 9/1995 | Hook et al. | 380/28 |
| 6,034,603 | A | * | 3/2000 | Steeves | 340/10.2 |
| 6,040,786 | A | * | 3/2000 | Fujioka | 340/928 |
| 6,104,333 | A | * | 8/2000 | Wood, Jr. | 341/173 |
| 6,259,926 | B1 | * | 7/2001 | Irie | 455/509 |
| 6,259,929 | B1 | * | 7/2001 | Kuisma | 455/575.1 |
| 6,952,157 | B1 | * | 10/2005 | Stewart et al. | 340/10.2 |
| 7,053,754 | B2 | | 5/2006 | Mani | |
| 7,450,010 | B1 | * | 11/2008 | Gravelle et al. | 340/572.1 |
| 7,455,223 | B1 | * | 11/2008 | Wilson et al. | 235/381 |
| 2006/0144943 | A1 | | 7/2006 | Kim | |
| 2008/0104392 | A1 | * | 5/2008 | Satoshi et al. | 713/164 |
| 2008/0170695 | A1 | * | 7/2008 | Adler et al. | 380/277 |

OTHER PUBLICATIONS

Identification cards—Contactless integrated circuit(s) cards—Proximity cards—Part 3: Initialization and anticollision; ISO/IEC CD 14443-3, Jan. 31, 2007, pp. 1-54.
Identification cards—Contactless integrated circuit(s) cards—Vicinity cards—Part 3: Anti-collision and transmission protocol; ISO/IEC FCD 15693-3, Mar. 10, 2000; pp. 1-44.
Understanding the Requirements of ISO/IEC 14443 for Type B Proximity Contactless Identification Cards; ISO/IEC 14443/RFID, Nov. 2005, pp. 1-27.

* cited by examiner

*Primary Examiner* — Michael G Lee
*Assistant Examiner* — Tabitha Chedekel
(74) *Attorney, Agent, or Firm* — Schiff Hardin LLP

(57) ABSTRACT

A communication system includes at least one contactless card configured to transmit an encoded identifier; and a reader configured to receive the encoded identifier and compare the received encoded identifier with an encoded reference card identifier, wherein the reader requests data from the contactless card if the encoded identifier matches the encoded reference card identifier.

25 Claims, 2 Drawing Sheets

IDENTIFICATION OF CONTACTLESS CARDS

FIELD OF THE INVENTION

The present invention relates generally to the field of the identification of contactless cards.

BACKGROUND OF THE INVENTION

Contactless cards, also known as chip cards or smart cards, operate on the basis of communication by an electromagnetic field with a read and/or write interrogating device, generically referred to as a reader.

In contactless card applications, the reader typically transmits an electromagnetic carrier wave. This transmitted carrier wave serves on the one hand to power the contactless card, which derives by induction the energy required for its operation, and on the other hand to initiate a communication between the card and the reader according to an established communication protocol. Communication protocols between a contactless card and a reader have been described, for example, in ISO standards 14443 A/B, 15693, and/or 18000.

When a plurality of contactless cards are within an interrogation field of a reader, the plurality of contactless cards will respond to a polling request of the reader. Each response signal may collide with the other cards' response signals, and therefore some cards will not be able to communicate with the reader until the reader can identify and address each card individually. Generally speaking, the reader does not know which cards are present in its interrogation field. As such, it is generally not possible for the reader to send a signal to a particular card that would activate this card while causing the others to be silent. The ISO standards describe two general types of anti-collision methods to overcome this problem: determinist methods and probabilistic methods.

According to the determinist methods, the reader sends marking commands for marking out time slots (i.e., response positions) on a time scale (i.e., temporal response scale) which includes $2^N$ time slots. Each card sends an identification signal including its identification number when a time slot corresponding to the first N bits of its identification number is reached. When a card is the only one to respond on a time slot, the reader identifies it and can select it.

If two cards respond during the same time slot, then the first N bits of their identification number are identical. The reader detects the collision and sends a nominative complementary identification request, including the N bits of the colliding identification numbers. This nominative complementary identification request only relates to the cards colliding on the time slot defined by the N bits specified. In response to the nominative complementary identification request, the cards concerned establish a new time slot, this time using the next N bits of their identification number, and send back a new identification signal.

The above sequence can be repeated several times until all the cards are identified and/or selected. It may also be repeated for each time slot as many times as the number of sub-groups of N bits remaining to be covered in the identification numbers.

The deterministic identification process has a "tree" structure in that each nominative complementary identification step only relates to the cards colliding during a pre-determined time slot. Therefore, for example, if two first cards have N identical first bits, and two other cards have N identical first bits that are different from the N first bits of the first two cards, the identification of the four cards will require at least two complementary identification steps. That is, one step will be needed to choose between the first two cards, and the second step to choose between the second two cards.

According to the second method, so-called probabilistic methods can be distinguished from the first, determinist methods in that the time slot of a card is independent of its identification number. The reader first sends a general identification request that triggers the generation of a random number in the module. This random number determines whether the card will respond to an identification signal, and include its identification number, or wait until the next cycle. Alternatively, the random number will determine during which time slot the card will respond in.

The effectiveness of probabilistic methods, when the number of cards increases, does not depend on the length of the identification numbers, but on the staging of the time scale. Therefore, the greater the number of time slots, the more effective the probabilistic method is. In the event of a collision, the non-identified cards receive a non-nominative complementary identification request and determine a new random time slot. As the complementary identification step is not nominative, it relates to cards that have collided on different time slots, unlike the nominative identification steps of determinist methods.

DETAILED DESCRIPTION OF THE INVENTION

The present invention includes a system and method for bulk identification of a plurality of contactless cards. Preferably, the invention includes a plurality of cards and a reader that can discriminate between multiple transmissions from the plurality of cards, and identify one or more, or preferably all of the cards from the received signal. In an embodiment the reader includes a correlator configured to scan an encoded identifier signal to determine whether one or more reference card identifiers is encoded in signals having encoded card identifiers corresponding to respective ones of the plurality of cards. The reader can discriminate between multiple transmissions from the plurality of cards, and identify one or more of the cards from the received signal. The reader can thus identify one, more, or all of the cards in bulk without having to incur a lengthy process of individually identifying cards, one at a time, then isolating the identified cards, then requesting retransmissions to identify the remaining cards in the plurality.

System Architecture

Figure 1:
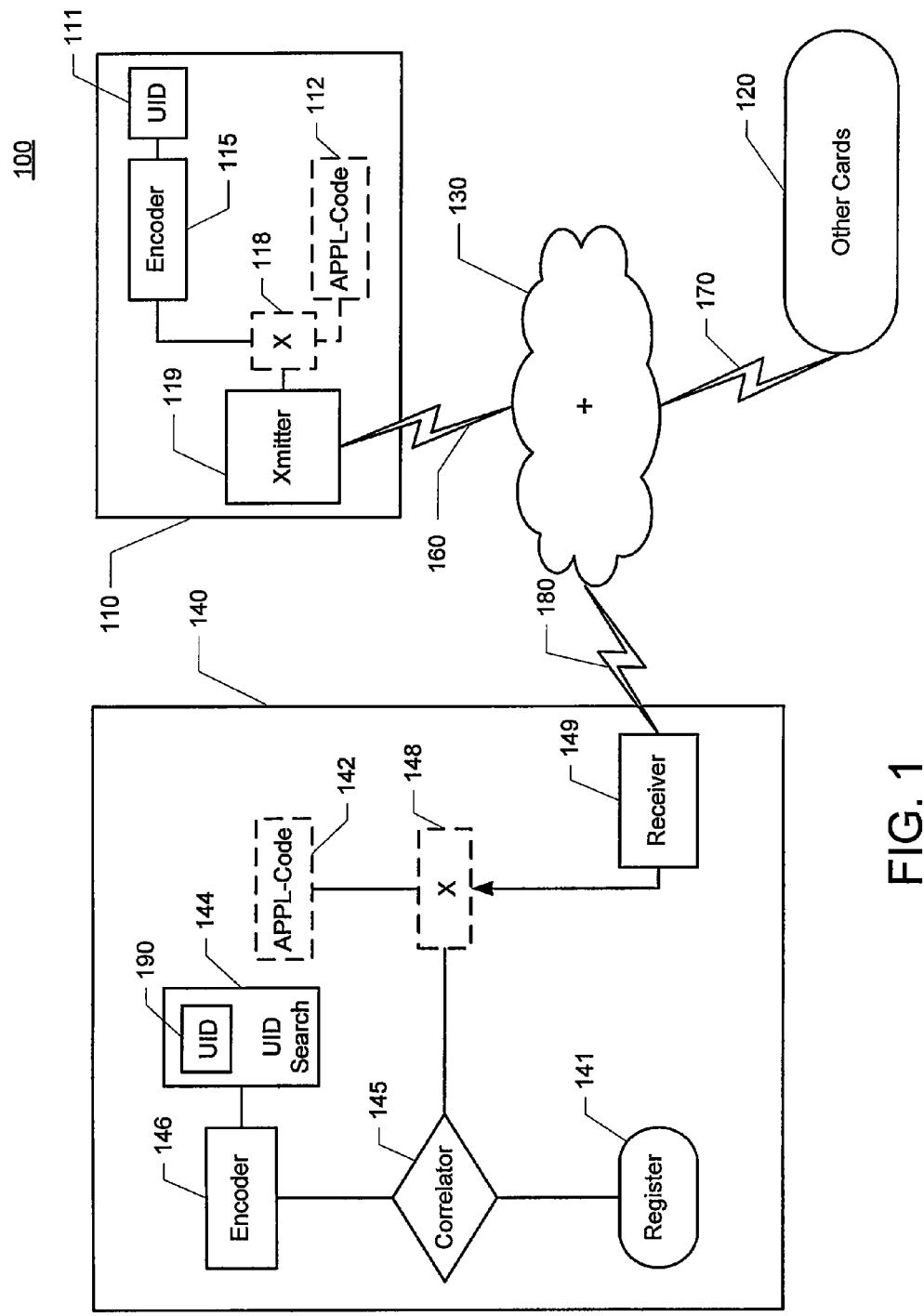
FIG. 1 is a block diagram illustrating an embodiment of a system for identification of cards according to the present invention.

FIG. 1 is a block diagram illustrating one embodiment of a system for bulk identification of contactless cards. The system preferably includes one or more contactless cards 110, 120, and a reader 140. Reader 140 and one or more cards 110, 120 send signals back and forth through a communication channel 130. As illustrated in FIG. 1, the signals comprise signal 160 from a single card 110, signals 170 from other cards 120, and a signal 180 received by reader 140, the signal 180 being a combination of signal 160 and signals 170. The received signal 180 might include collisions of signals from the transmitting cards 110, 120 in communication channel 130. In a preferred embodiment, the transmissions are radio-frequency transmissions in accordance with ISO standards 14443 A/B, 15693 and/or 18000, and communication channel 130 is space, but other communications channels and transmissions are contemplated, as are well-known to those with skill in the art.

Card 110 includes a first memory 111, encoder 115, and a transmitter 119. The card 110 may also include a receiver and a power supply, which are not shown in FIG. 1. Card 110's receiver generates power from a signal transmitted by the reader 140, and supplies power to operate components in the card 110. In an embodiment, card 110 includes a second memory 112. Card 110 can be inductively powered, and can alternatively be battery powered, solar powered, or the like.

First and second memories 111, 112 are any type of memory known to those with skill in the art for storing information. In a preferred embodiment, first and second memories 111, 112 are read-only memories that have stored a unique card identifier, also known as a unique identifier (UID), and an application code, respectively. The application code is not necessarily unique, and more than one contactless card may share the same application code. The unique card identifier stored in first memory 111 is preferably generated during manufacture, and is different from the card identifier in every other card 120, whose card identifiers are in turn different from each other. First and second memories 111, 112 are illustrated as separate memory devices, but can be a single memory having the card identifiers and application codes stored at different addresses.

Encoder 115 is a processing device that takes the card identifier output by first memory 111 and generates an encoded card identifier. Encoder 115 can be implemented in hardware, software, or a combination of both. In a preferred embodiment, encoder 115 is a pseudo random number generator that is seeded by the card identifier from first memory 111. The pseudo-random generator generates a new number starting from an initial number (the so-called seeded number, in this case card identifier in first memory 111) by means of a predetermined algorithm. By successively applying the same algorithm to the last number generated, there is obtained a sequence of numbers that are all predetermined by the chosen algorithm and the initial number. Thus there is obtained, with a very good approximation, one sequence of random numbers which are mutually independent and uniformly distributed in a given interval, where each random number comprises a series of bits of predetermined length, preferably much longer than card identifier stored in first memory 111. The encoded card identifier, preferably a pseudo random number generated by encoder 115, represents the card identifier, but preferably comprises much more redundant information that is therefore resistant to collision, due to the ability to reconstruct the encoded identifier from a non-collided portion of the information.

In another embodiment, card 110 includes second memory 112 and a mixer 118. The second memory 112 is configured to store an application code, such as an Application Family Identifier (AFI) defined in ISO 15693. The AFI describes a type of application targeted by the reader 140. This identifier is used to extract all cards in the reader field that meet the required application criteria. After the reader sends out the AFI, only the AFI-compliant cards of the appropriate family will respond. Of course the application is not limited to the application code being the AFI as defined in ISO 15693; the application code may be any application code suitable for the intended purpose.

Mixer 118 is preferably an exclusive- or (XOR) gate that combines the encoded identifier with the application code stored in second memory 112. The encoded identifier is transferred from the encoder 115 to the mixer 118. The output of mixer 118 comprises card transmission information that can be used to identify card 110. If the application group feature is not included, the card transmission information from the encoder 115 is transmitted to the transmitter 119 without being processed by the mixer 118.

Transmitter 119 transforms the identification information (with or without the application code information, depending on the embodiment) into a format suitable for transmission through communication channel 130. Any of numerous coding techniques may be utilized to improve the reliability of a channel. For example, in an Automatic Repeat request (ARQ) system, enough parity bits are transmitted to detect an error using an error identification code. However, corrupted data must always be retransmitted since there is not enough information in the parity bits to correct the detected errors. The number of retransmissions depends on the channel error distribution so there is no guarantee that there will be an upper bound on the delay. In a preferred embodiment, transmitter 119 uses a forward error correcting (FEC) code, to harden the card transmission information against destruction by colliding transmissions from the other cards 120 into communication channel 130. In a FEC code, enough extra parity bits are transmitted to enable a receiver to correct the maximum expected amount of corrupted data without any further retransmission. In another preferred embodiment, transmitter 119 waits a random amount of time after reader 140 requests cards to respond to its query for identification.

Other cards 120 may comprise the components described above in connection with card 110. Alternatively, other cards 120 may comprise different components, but like card 110, other cards 120 respond to a query from reader 140 and generate their own signals 170, which are sent through communication channel 130. The information sent by the other cards 120 may collide with the signal 160 sent by card 110, and may collide with each other during transmission. Again, signal 180 received by reader 140 is a combination of both signal 160 and signals 170.

As stated above, communication channel 130 may comprise any channel known to those with skill in the communications art. Communication channel 130 is preferably space, but it may be a fiber optic cable, water, air, or some other channel through which signals 160, 170 may propagate. Likewise, signals 160, 170 are preferably radio frequency signals, but they may be signals in other electromagnetic spectrums such as infra-red or higher frequency light, x-ray or gamma rays. Alternatively, signals 160, 170 may be acoustic signals, or other pressure waves designed for the transmission of information.

Reader 140 comprises a receiver 149, an encoder 146, a correlator 145, a UID search device 144, and a first memory, or register, 141. Reader 140 further comprises a transmitter (not shown) configured to send a signal such as an identification query to one or more contactless cards 110, 120.

Receiver 149 receives the signal 180 from communication channel 130 and extracts card transmission information from the received signal 180. In a preferred embodiment, receiver 149 uses a forward error correcting code, and preferably a Manchester code, to identify any bits that are collided and corrects them if possible, as described above in connection with transmitter 119.

In the other embodiment in which the application group feature is additionally included, the reader 140 also includes a second memory 142 and a mixer 148. The second memory 142 is configured to store a reference application code. Again, as described above for card 110, the application code describes a type of application targeted by the reader 140 and is used to extract all cards in the reader field that meet the required application criteria. The mixer 148 is preferably a processing device equivalent to an exclusive- or (XOR) gate that combines the card transmission information with the reference application code stored in second memory 142. The mixer 148 outputs the encoded identifier signal that can be used to identify one or as many as all cards 110, 120. If the application group feature is not included, the card transmission information from the receiver is transmitted to the correlator 145 without being processed by the mixer 148.

Encoder 146 is a processing device that generates an encoded reference card identifier from card identifiers 190 generated by UID search device 144. Encoder 146 can be implemented in hardware, software, or a combination of both. In a preferred embodiment, encoder 146 is a pseudo random number generator having the same algorithm as that used by the encoder 115 in card 110. The preferred pseudo random number generator is seeded by the card identifiers 190 generated by UID search device 144. The encoded card identifier represents a reference, that is a possible, card identifier 190 that is embedded in the encoded identifier signal received from the receiver 149 or mixer 148 by correlator 145.

Correlator 145 is a processing device that takes an encoded reference card identifier, also known as a reference user identification (UID), generated by encoder 146 and determines whether the encoded reference card identifier is present in the encoded identifier signal received from the receiver 149 or mixer 148. In a preferred embodiment, correlator 145 performs calculations that effectively scan the entire encoded identifier signal to check for the presence of the encoded identifier within the encoded identifier signal. If a reference card identifier is found in the encoded identifier signal, the found card identifier is registered in memory 141.

UID search device 144 is a processing device that selects reference card identifiers from a list of known card identifiers 190 and provides them to encoder 146. It should be noted that UID search device 144 may provide codes one-at-a-time to encoder 146, or in a preferred embodiment, UID search device may provide a plurality of reference card identifiers concurrently to encoder 146, as explained further below.

First and second memories 141, 142 are any type of memory known to those with skill in the art for storing information. In a preferred embodiment, memories 141, 142 are random-access memories that have stored identified card identifiers and a shared application code of interest, respectively. The identified card identifiers stored in memory 141 are preferably determined during the reception of signal 180. In one embodiment, the unique card identifiers are determined and stored concurrent with the reception of signal 180. One or more card identifiers may be present in the received signal 180, which represent the card identifiers of one or more cards 110, 120. Memories 141, 142 are illustrated as separate memory devices, but can be a single memory having information stored at different addresses.

As mentioned above, UID search device 144, correlator 145 and encoder 146 may search for and determine if a particular reference card identifier is present in the encoded identifier signal. In a preferred embodiment, such processing may be conducted in parallel, as is well-known in the art. Whether processed in serial or parallel, the identified card identifiers are stored in memory 141.

System Operation

The following discussion describes some of the methods performed by the inventive system. To provide context, the operation of an exemplary, preferred embodiment of program code embodied in UID search device 144, correlator 145, encoder 146, mixer 148, and receiver 149 is described with reference to the operation of reader 140. A similar process is performed by each card 110, 120 that, in aggregate, is somewhat analogous but inverse of that performed by reader 140.

Figure 2:
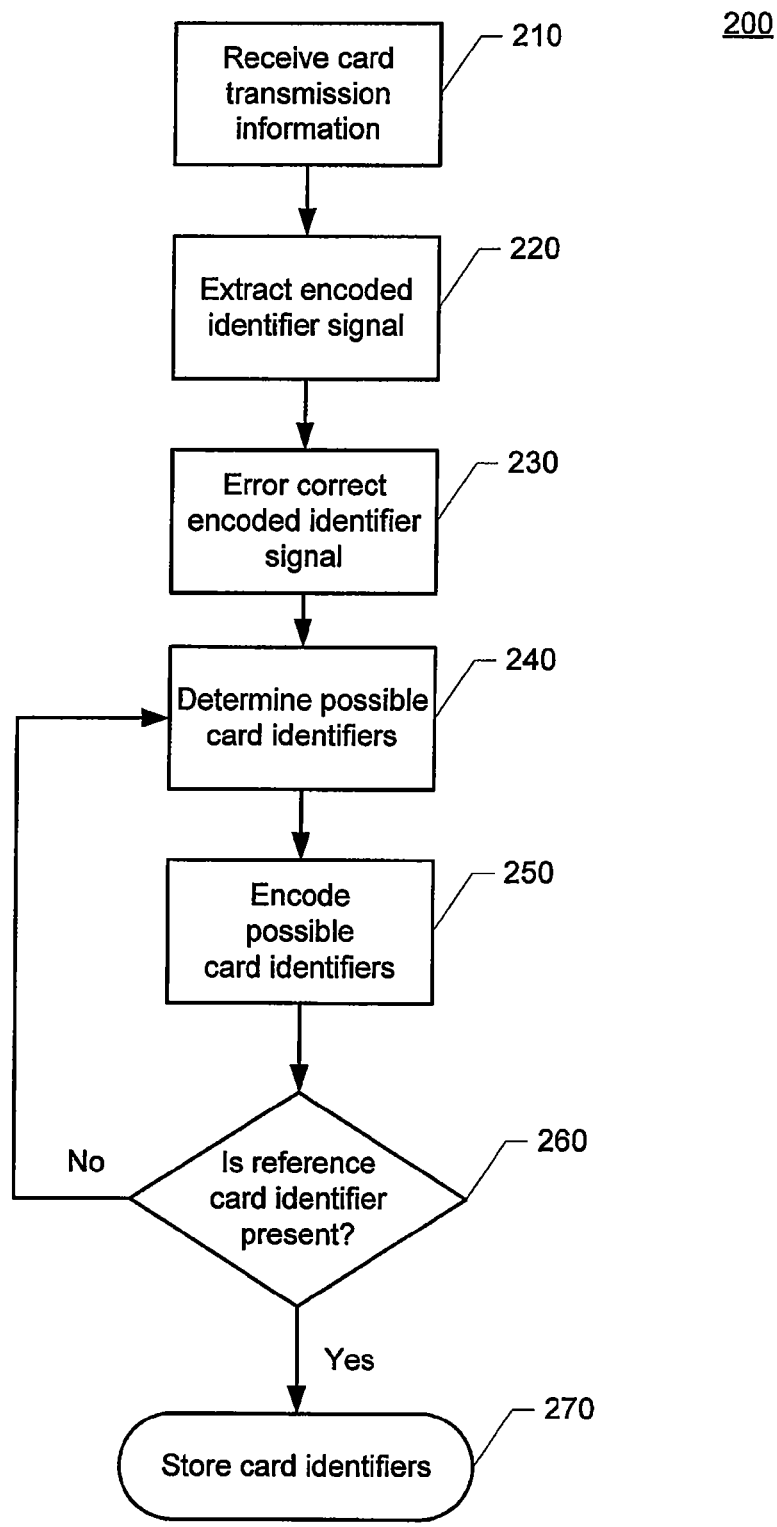
FIG. 2 is a flow chart illustrating an embodiment of a method for determining contactless card identifiers transmitted in a channel according to the present invention.

FIG. 2 is a flow chart illustrating one embodiment of a method for determination of contactless card identifiers transmitted through a channel. The reader performing the steps of this method preferably incorporates a program code for its processing devices, corresponding to UID search device 144, correlator 145, encoder 146, mixer 148 and/or receiver 149. As shown in FIG. 2, in step 210, the reader receives card transmission information. As described above, the card transmission information may include information from a plurality cards that respond to the reader's query for identification within communications range, i.e., in the interrogation field of the reader.

In step 220, the reader extracts an encoded identifier signal from the card transmission information received from the communications channel. In one embodiment, the reader additionally uses an application code to discriminate transmissions from cards used for a different application that have different application codes.

In step 230, the reader corrects any errors detected in the encoded identifier signal. Such errors might have been caused by collisions from the plurality of cards transmitting information in response to the reader's query for identification, or from other sources of noise or interference.

In step 240, the reader identifies one or more reference card identifiers to be searched for in the corrected, encoded identifier signal.

In step 250, the reader encodes the reference card identifiers. Preferably, the reader uses a pseudo random number generator algorithm identical to that used by the cards, wherein the reference card identifiers seed the algorithm.

In step 260, the reader correlates the one or more encoded reference card identifiers with the corrected encoded identifier signal to determine whether any of the one or more reference card identifiers can be found within the encoded identifier signal. If a particular card identifier is not present, the method continues processing at step 240 to determine other reference card identifiers. This processing can continue until all reference identifiers have been tested. Alternatively, the reader can correlate more than one encoded reference card identifier with the corrected encoded identifier signal substantially simultaneously.

If a reference card identifier is present, then in step 270, the identifier is stored in the reader for subsequent use communicating with the identified card.

The order in which the steps in this preferred embodiment are presented are not necessarily the order in which the steps are performed. For example, steps 240 and 250 may be performed concurrently with steps 220 and 230.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A contactless card comprising:
   a first memory configured to store a fixed, unique card identifier; and
   an encoder configured to generate an encoded card identifier from the card identifier,
   wherein the contactless card is identifiable by any reader that is configured to operate according to a same communication protocol as the contactless card, via the encoded card identifier based on a correlation between the encoded card identifier and a reference card identifier stored within the reader.

2. The contactless card of claim 1, wherein the encoder is a pseudo random number generator seeded by the card identifier.

3. The contactless card of claim 1, further comprising:
a second memory configured to store an application code; and
a mixer configured to combine the application code and the encoded card identifier.

4. The contactless card of claim 1, further comprising a transmitter configured to transmit a signal including the encoded card identifier.

5. The contactless card of claim 3, further comprising a transmitter configured to transmit a signal including the combined application code and encoded card identifier.

6. The contactless card of claim 3, wherein the mixer comprises an exclusive- or gate.

7. The contactless card of claim 3, wherein the first and second memories are portions of a single memory.

8. The contactless card of claim 4, wherein the transmitter is configured to delay sending the signal including the encoded card identifier for a random amount of time after receiving a signal including a polling query from a reader.

9. The contactless card of claim 5, wherein the transmitter is configured to delay sending the signal including the combined application code and encoded card identifier for a random amount of time after receiving a signal including a polling query from a reader.

10. A contactless card reader, comprising:
a receiver configured to receive a signal transmitted by a contactless card; and
a correlator configured to scan the signal to determine whether a card identifier matching a reference card identifier stored within the reader is encoded in the transmitted signal,
wherein the card identifier is fixed and unique to the contactless card such that the contactless card is identifiable by any reader that is configured to operate according to a same communication protocol as the contactless card based on a correlation between the encoded card identifier and the reference card identifier.

11. The contactless card reader of claim 10, wherein the receiver is further configured to receive signals transmitted respectively by a plurality of contactless cards, and the correlator is further configured to scan the plurality of received signals to determine whether card identifiers matching a plurality of reference card identifiers are encoded in the transmitted signals.

12. The contactless card reader of claim 10, further comprising an encoder configured to encode the reference card identifier to be provided to the correlator.

13. The contactless card reader of claim 12, wherein the encoder comprises a random number generator seeded with the reference card identifier.

14. The contactless card reader of claim 13, further comprising an identifier search device configured to provide the encoder with the reference card identifier.

15. The contactless card reader of claim 10, further comprising a mixer configured to combine the encoded card identifier with an application code.

16. A communication system comprising:
a contactless card configured to transmit a signal including an encoded card identifier which is based on a fixed, unique card identifier; and
a reader configured to receive the signal including the encoded card identifier and to compare the received card identifier with an encoded reference card identifier stored within the reader,
wherein the contactless card is identifiable by any reader that is configured to operate according to a same communication protocol as the contactless card, via the encoded card identifier based on correlation between the encoded card identifier and the encoded reference card identifier.

17. The communication system of claim 16, wherein the contactless card comprises:
a first memory configured to store the card identifier;
an encoder configured to encode the card identifier to form the encoded card identifier; and
a transmitter configured to transmit a signal including the encoded card identifier.

18. The communication system of claim 17, wherein the contactless card further comprises:
a second memory configured to store an application code; and
a mixer configured to combine the encoded card identifier with the application code.

19. The communication system of claim 16, wherein the reader comprises:
a receiver configured to receive the signal including the encoded card identifier;
an identifier search device configured to provide the encoded reference card identifier; and
a correlator configured to compare the encoded card identifier with the encoded reference card identifier to determine whether the card identifier matches the reference card identifier.

20. A communication system comprising:
a contactless card configured to transmit a signal including an encoded card identifier which is based on a fixed, unique card identifier; and
a reader configured to receive the signal including the encoded card identifier and to compare the received card identifier with an encoded reference card identifier stored within the reader,
wherein the reader requests data from the contactless card if the encoded card identifier matches the encoded reference card identifier, and
wherein the contactless card is identifiable by any reader that is configured to operate according to a same communication protocol as the contactless card, via the encoded card identifier based on a correlation between the encoded card identifier and the encoded reference card identifier.

21. A communication system comprising:
a plurality of contactless cards, each of which is configured transmit a signal including a respective encoded card identifier and an application code, wherein the encoded card identifiers are based on respective fixed, unique card identifiers; and
a reader configured to receive the signals including the respective encoded card identifiers and application codes, to compare the received encoded card identifiers and application codes with at least one encoded reference card identifier and reference application code, respectively, stored within the reader, and to request data from any of the contactless cards if the respective encoded card identifier and/or application code matches the at least one encoded reference card identifier and/or reference application code, respectively, wherein the plurality of contactless cards are identifiable by any reader that is configured to operate according to a same communication protocol as the plurality of contactless cards, via the respective encoded card identifiers based on correlations between any of the encoded card identifiers and the encoded reference card identifiers.

22. A method of identifying a contactless card comprising:
receiving a signal including an encoded card identifier from a contactless card, wherein the encoded card identifier is based on a fixed, unique card identifier; and
correlating, by a reader, the encoded card identifier with an encoded reference card identifier stored within the reader to determine whether the encoded card identifier matches the encoded reference card identifier,
wherein the contactless card is identifiable by any reader that is configured to operate according to a same communication protocol as the contactless card, via the encoded card identifier based on a correlation between the encoded card identifier and the encoded reference card identifier.

23. The method of claim 22, further comprising seeding a random number generator with the encoded reference card identifier to generate an encoded card identifier.

24. The method of claim 22, further comprising, if the encoded card identifier matches the encoded reference card identifier, storing the encoded card identifier in a memory.

25. The method of claim 22, further comprising combining the encoded identifier with an application code.

\* \* \* \* \*